United States Patent [19]

Tokunaga et al.

[11] Patent Number: 5,671,632
[45] Date of Patent: Sep. 30, 1997

[54] METHOD FOR MANUFACTURING A VIBRATOR

[75] Inventors: Yuichiro Tokunaga; Takeshi Inao, both of Nagaokakyo, Japan

[73] Assignee: Murata Manufacturing Co., Ltd., Nagaokakyo, Japan

[21] Appl. No.: 643,533

[22] Filed: May 6, 1996

Related U.S. Application Data

[63] Continuation of Ser. No. 372,913, Jan. 17, 1995, abandoned.

[30] Foreign Application Priority Data

Jan. 20, 1994 [JP] Japan ................... 6-022003

[51] Int. Cl.$^6$ ................... B21C 1/18; B21C 9/00
[52] U.S. Cl. ................... 72/275; 72/282; 72/286
[58] Field of Search ................... 72/291, 290, 282, 72/274, 286, 342.1

[56] References Cited

U.S. PATENT DOCUMENTS

| 168,975 | 10/1875 | Farmer | 72/282 |
|---|---|---|---|
| 323,762 | 8/1885 | White | 72/282 |

FOREIGN PATENT DOCUMENTS

| 129352 | 12/1984 | European Pat. Off. | 72/290 |
|---|---|---|---|
| 1164727 | 10/1958 | France | 72/274 |

*Primary Examiner*—Daniel C. Crane
*Attorney, Agent, or Firm*—Nikaido, Marmelstein, Murray & Oram LLP

[57] ABSTRACT

A wire 10 made of metal is shaped into a wire having a diameter of 5 mm by a circular die 12 and then, cut to a plurality of lengths of 500 mm. The wire 10 is heated in hydrogen atmosphere at 800° C. for two hours. Then, the wire 10 is drawn by a plurality of triangular dies 14, 16, 18, and 20 sequentially without winding the wire 10 around a reel. As a result, the wire 10 is shaped into an approximately regular triangular configuration in section. The wire 10 shaped into the approximately regular triangular configuration is cut to a plurality of lengths of 40 mm and then supplied to a predetermined place for a subsequent processing.

3 Claims, 6 Drawing Sheets

1

METHOD FOR MANUFACTURING A VIBRATOR

This application is a continuation of application Ser. No. 08/372,913, filed Jan. 17, 1995, now abandoned.

BACKGROUND OF THE INVENTION

1. Field of the Invention

The present invention relates to a method for manufacturing a vibrator, more particularly, to a method for manufacturing a vibrator which is used as a vibrating body of a vibrating gyroscope.

2. Description of the Prior Art

A triangular prism shaped vibrator made of metal such as an alloy containing iron is known. The vibrator is used for such as a rotational angular velocity sensor. In this case, piezoelectric elements are mounted on side faces of the vibrator. As a method for manufacturing such a vibrator, a cylindrical metal material is drawn to be shaped into a regular triangular prism shaped configuration in section.

In this case, it is preferable that the vibrator has constant elastic characteristic in order to use it as the vibrator of the rotational angular velocity sensor. Thus, a specific amount of elastic strain is given to the vibrator in the process of manufacturing. A specific amount of elastic strain is given to the vibrator so that the vibrator has the constant elastic characteristic.

Referring to FIGS. 4 and 5, the drawing process of the conventional method for manufacturing the vibrator is described below. First, a wire 1 made of metal is prepared. The wire 1 is shaped into a circular configuration in section having a diameter of 4.2 mm and wound around a drum. Then, the wire 1 is drawn to stretch by a drawing device 2. The drawing device 2 comprises four triangular dies 3a through 3d for shaping the configuration of the wire 1 into an approximate regular triangular configuration in section while the device 2 is drawing the wire 1. FIG. 5 is an illustration view showing the configurations of molding holes of the four triangular dies 3a through 3d. As shown in FIG. 5, the sectional areas of the molding holes of the four triangular dies 3a through 3d are so set as follows, respectively: 11.2562 mm$^2$, 9.1414 mm$^2$ 7.4332 mm$^2$ and 5.9067 mm$^2$. That is, the sectional area of the wire 1 is reduced by each of the four triangular dies 3a through 3d by about 19% respectively.

With the passage of the wire 1 through each of the triangular dies 3a through 3c, it is gradually approximated to a regular triangle in section and stretched. Drums 4a, 4b, 4c and 4d are provided downstream of the triangular dies 3a, 3b and 3c, respectively. The wire 1 is finally wound around a winding reel 5 at a predetermined tensile force, after the wire 1 is passed through each of the triangular dies 3a through 3c, with the wire 1 wound around each of the drums 4a through 4d with a turn. The wire 1 wound around the winding reel 5 is fed out therefrom and has the surface thereof chemically treated. Then, the wire 1 is passed through the triangular die 3d to draw the wire 1 into a predetermined approximately regular triangular configuration. Then, the wire 1 is cut off to a plurality of lengths of 4000 mm. Thereafter, the wire 1 is drawn again to straighten each piece. Thereafter, each piece is cut off to a plurality of lengths of 40 mm, and then, supplied to a predetermined place for a subsequent process.

However, the above-described manufacturing method comprises the process of bending the wire 1 by means of the drums 4a through 4d and the winding reel 5 during the drawing process. Consequently, in the sectional area of the wire 1 having the approximately regular triangular configuration in section, the strain distribution in the vicinity of one side of the regular triangle and that in the vicinity of the other sides thereof are unsymmetrical with respect to each line connecting the center of gravity thereof and each vertex thereof interposed between two sides. Further, the wire 1 has a low degree of plastic deformation in the vicinity of each vertex of the approximately regular triangle in section. Thus, the elastic strain in the vicinity of each vertex does not fall in the range in which a constant elastic characteristic is displayed. Consequently, as shown in FIG. 6, the differences between the temperature drifts in the natural frequencies of the vibrators manufactured according to the conventional manufacturing method diverge widely. That is, the conventional manufacturing method has a low efficiency in manufacturing the vibrators. When the vibrator is used as a rotational angular velocity sensor, the conventional manufacturing method has a problem that the temperature drifts are great and the characteristics of the vibrators are varied from each other and are likely to change, depending on the atmospheric temperature.

SUMMARY OF THE INVENTION

Therefore, it is a primary object of the present invention to provide a method for manufacturing a vibrator which operates with a small temperature drift, and operates reliably without being affected by a temperature change, at a high productivity.

A method for manufacturing a vibrator according to the present invention comprises the step of drawing a wire made of metal. In the method, the wire is processed not by winding the wire around a reel but by keeping it straight after the drawing step is completed.

In another aspect of the present invention, a method for manufacturing a vibrator comprises the steps of cutting off a wire made of metal to a plurality of pieces having a predetermined length, respectively, and drawing the wire in a straight configuration by passing the wire through a plurality of dies. In the method, the strain distribution in one sides of a section and that in the other side thereof are symmetrical with respect to each line connecting the center of gravity thereof and the vertices thereof, and the strain distribution of the wire in the vicinity of the surface thereof falls within the range of elastic strain in which a constant elastic characteristic of the wire is displayed.

According to the method for manufacturing the vibrator of the present invention, the wire is drawn in a straight line, namely, without being wound around drums or winding reels. Thus, the strain distribution in the vicinity of one side of the approximately regular triangle and that in the vicinity of the other sides thereof are symmetrical with respect to the lines connecting the center of gravity thereof and the vertices thereof interposed between all the sides. That is, the wire has a uniform strain distribution. Further, the wire has a large degree of plastic deformation in the vicinity of each vertex of the approximately regular triangle in section.

Therefore, the strain distribution in the vicinity of one side of the approximately regular triangle and that in the vicinity of the other sides thereof are symmetrical with respect to the line connecting the center of gravity thereof and the vertex thereof interposed between each of the sides and is uniform. Thus, the difference between temperature drifts in the natural frequencies of the vibrator is stabilized. Hence, the vibrator can be manufactured at a high productivity. When the vibrator according to the present invention is installed in a rotational angular velocity sensor, the vibrator performs its function reliably without being affected by fluctuations in atmospheric temperature. In addition, the wire has a large degree of plastic deformation in the vicinity of each vertex of the approximately regular triangle in section. Thus, the vibrator can display a preferably constant elastic characteristic.

The above and other objects, features, aspects and advantages of the present invention will become more apparent from the following detailed description of the embodiments with reference to the accompanying drawings.

DESCRIPTION OF THE PREFERRED EMBODIMENTS

A method for manufacturing a vibrator according to an embodiment of the present invention is described below with reference to FIGS. 1 through 3.

Figure 1A:
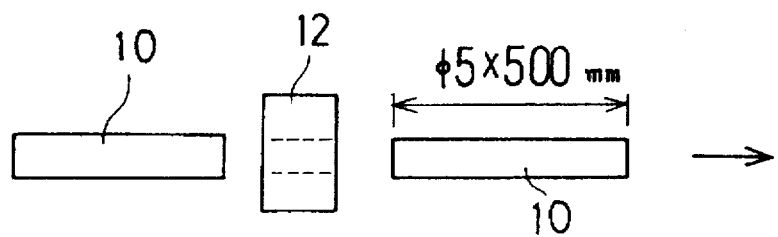
FIG. 1(a)-1(d) are process views showing a method for manufacturing a vibrator according to an embodiment of the present invention.

FIGS. 1(a)-1(d) are views showing a method for manufacturing a vibrator according to an embodiment of the present invention. First, a wire 10 made of metal is prepared. Favorably, an alloy containing iron is used. More favorably, an alloy containing iron-nickel-chromium is used. As shown in FIG. 1(a), the wire 10 is drawn by using a cylindrical die 12. The cylindrical die 12 has a circular molding hole having a diameter of 5 mm. Thus, the wire 10 is shaped into a round wire having a diameter of 5 mm, and then, cut to a plurality of lengths of 500 mm.

Figure 1B:
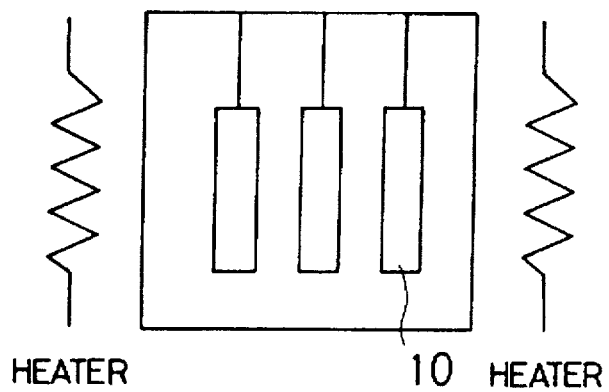
Figure 2:
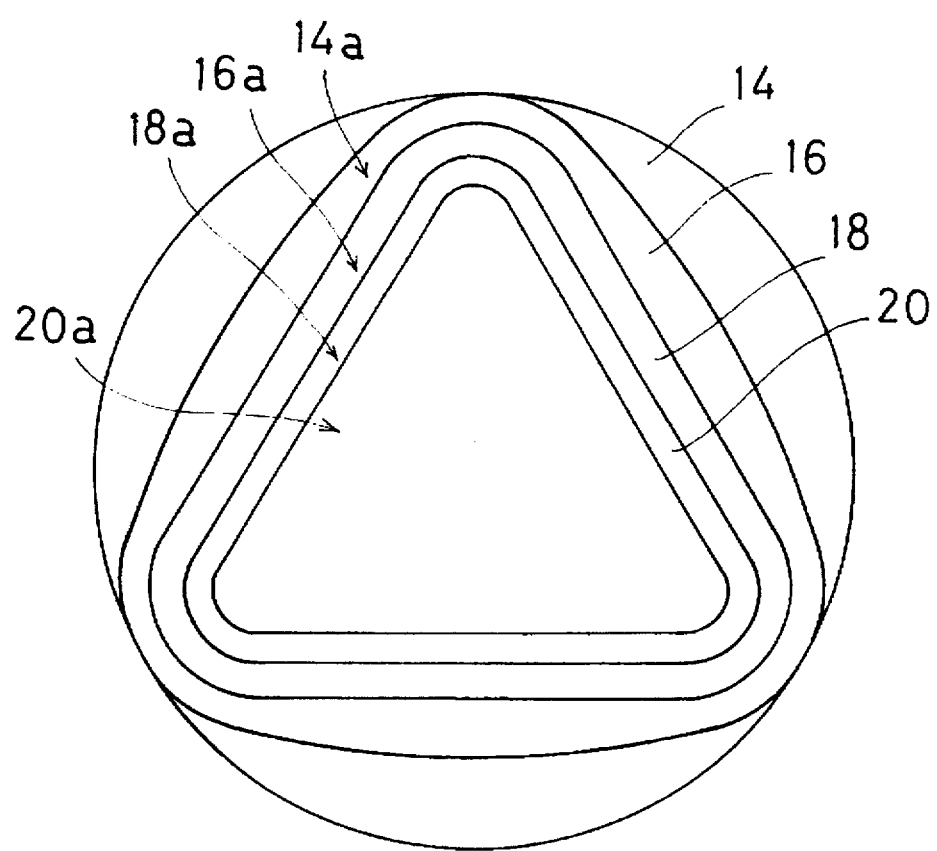
FIG. 2 is an illustration view showing a plurality of triangular dies to be used in the embodiment shown in FIG. 1.

Then, as shown in FIG. 1(b), the wire 10 is heated in hydrogen atmosphere to about 800° C. for about two hours by a heating means comprising heaters. The heated wire 10 is washed with an acid such as ferric chloride to roughen its surface in preparation for a drawing process to be subsequently performed.

Figure 1C:
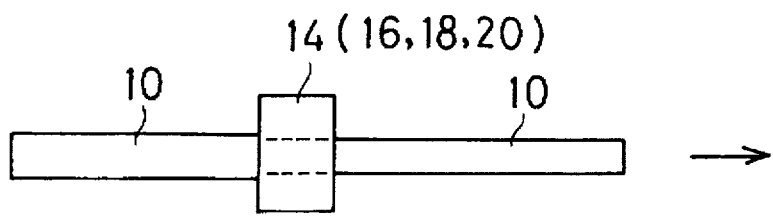

Referring to FIG. 1(c), the wire 10 is passed through triangular dies 14, 16, 18 and 20 sequentially to draw it while the outer surface thereof is being shaped. As shown in FIG. 2, the triangular dies 14, 16, 18 and 20 have approximately regular triangular molding holes 14a, 16a, 18a and 20a, respectively. Different from the conventional molding holes shown in FIG. 5, the molding holes 14a, 16a, 18a, and 20a have approximately similar forms. The sectional area of the molding holes 14a, 16a, 18a and 20a are set to be 14.7584 mm$^2$ 11.0044 mm$^2$ 8.0967 mm$^2$ and 6.1024 mm$^2$ respectively. That is the sectional area of the wire 10 is reduced by each of the four triangular dies 14a through 20a by about 25%, respectively. The wire 10 is drawn through the triangular dies 14, 16, 18 and 20 sequentially at a drawing force of about 500 kgf. As a result, the wire 10 is shaped into an approximately regular triangular configuration in section.

Figure 1D:
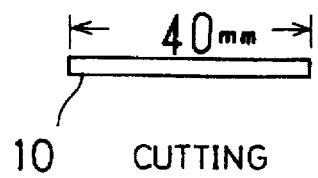

Then, as shown in FIG. 1(d), the wire 10 having approximately regular triangular configuration in section is cut to a plurality of lengths of 40 mm and then supplied to a predetermined place for a subsequent processing.

According to the method for manufacturing a vibrator of this embodiment, the wire 10 is drawn with the wire 10 kept in a straight condition and orientation until after at least the process of drawing it is completed. Thus, in the wire having an approximately regular triangular configuration in section made according to this invention, the strain distribution in one side of the approximately regular triangle and that in the other sides thereof are symmetrical and uniform with respect to each of the lines connecting the center of gravity thereof and the vertices thereof.

Figure 5:
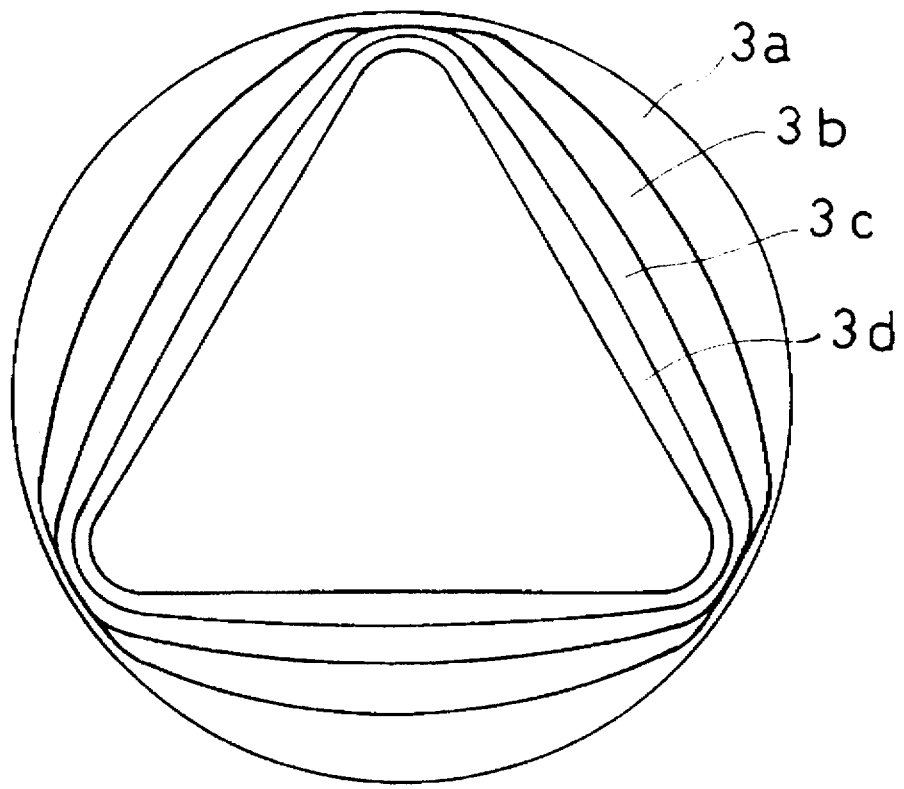
FIG. 5 is an illustration view showing a plurality of triangular dies to be used in the conventional method of manufacturing a vibrator in FIG. 4.
Figure 6:
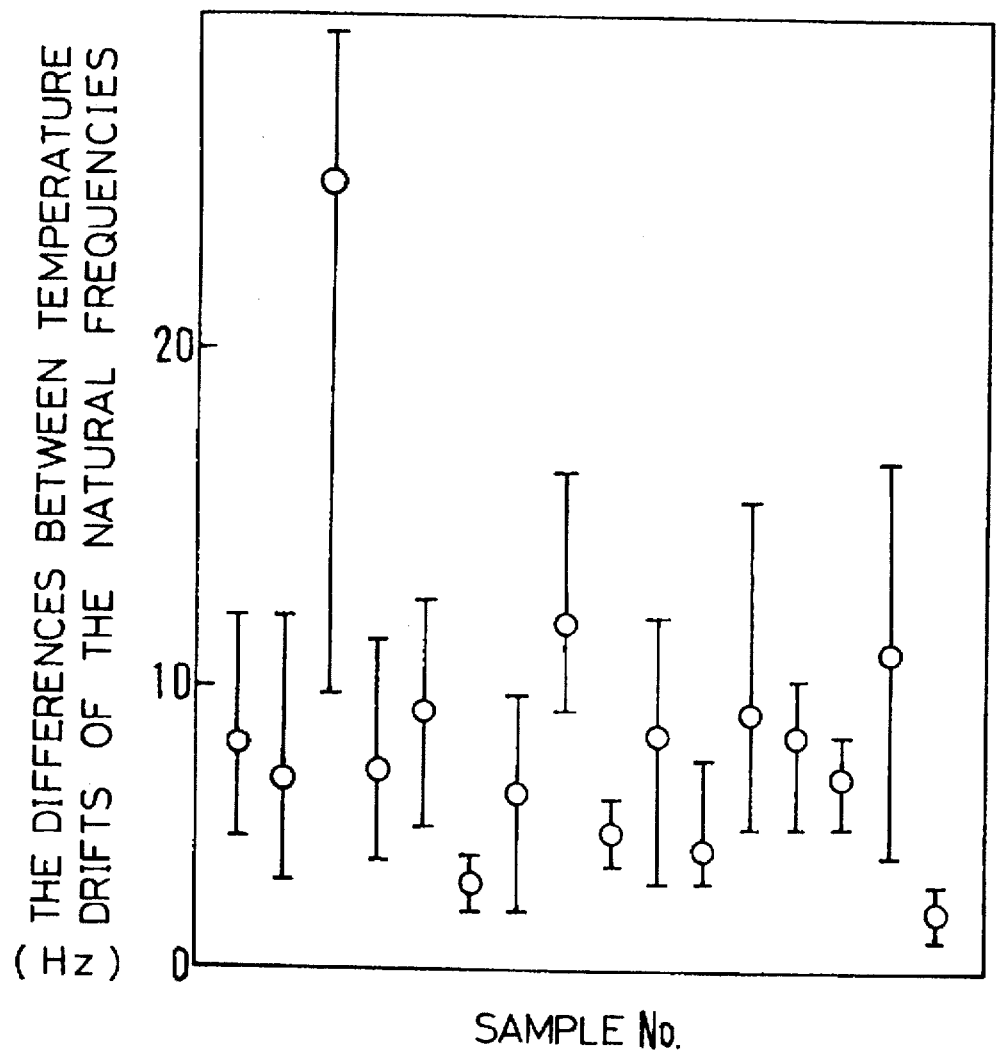
FIG. 6 is a graph showing the unevenness of the differences between temperature drifts of the natural frequencies of the vibrators manufactured according to the embodiment shown in FIG. 4.

In the conventional method for drawing the wire by using the triangular dies 3a through 3d shown in FIG. 5, the resulting wire 1 has a low degree of plastic deformation in the vicinity of each vertex of the approximately regular triangle in section. Thus, the elastic strain in the vicinity of each vertex does not fall in the range of elastic strain in which a constant elastic characteristic is displayed. According to this embodiment of this invention, the diameter of the wire 10 is set to be larger than that of a conventional wire 1. Further, the area-reducing percentage of the triangular dies 14, 16, 18 and 20 is greater than that of the triangular dies 3a through 3d. Furthermore, the molding holes 14a, 16a, 18a and 20a have approximately similar forms as shown in FIG. 2. Therefore, the wire has a larger degree of plastic deformation even in the vicinity of each vertex of the approximately regular triangle in section. As a result, the elastic strain in the vicinity of each vertex, the plastic deformation falls in the range of elastic strain in which a constant elastic characteristic is displayed. In this case, the most suitable range of elastic strain in which a constant elastic characteristic is displayed is selected, depending on the composition of a wire.

Figure 3:
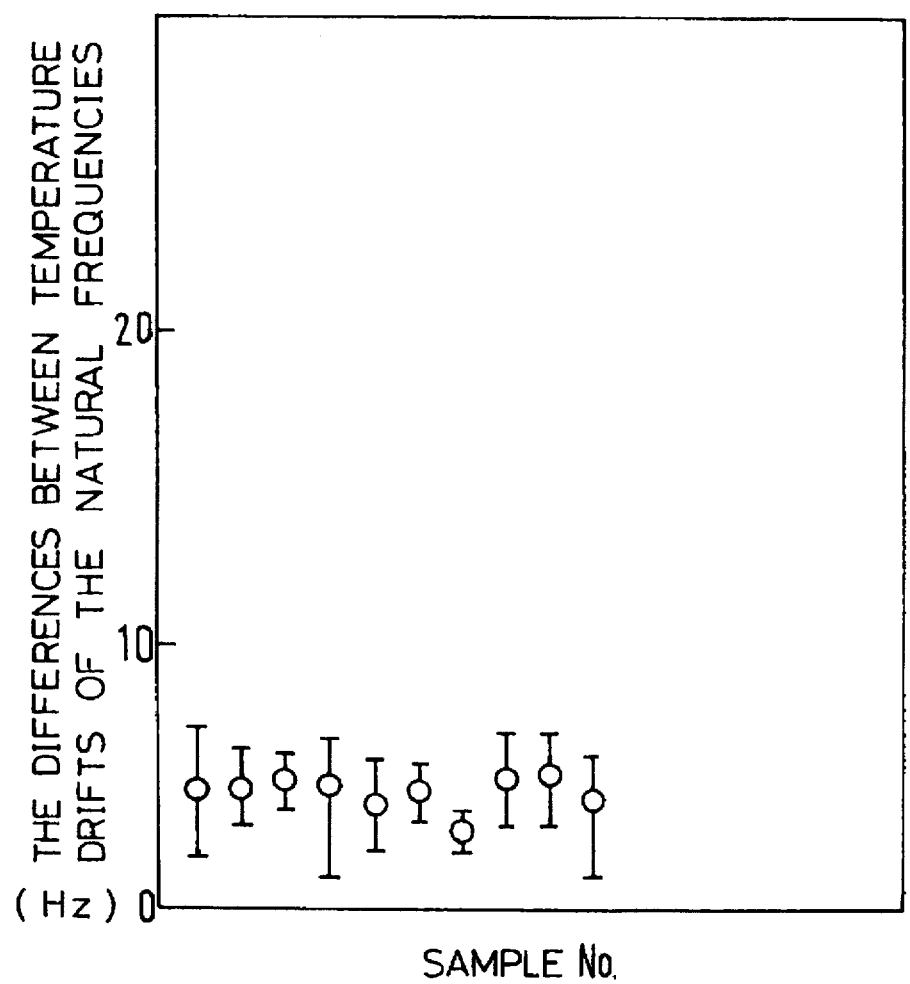
FIG. 3 is a graph showing the unevenness of the differences between temperature drifts of the natural frequencies of the vibrators manufactured according to the embodiment shown in FIG. 1.
Figure 4:
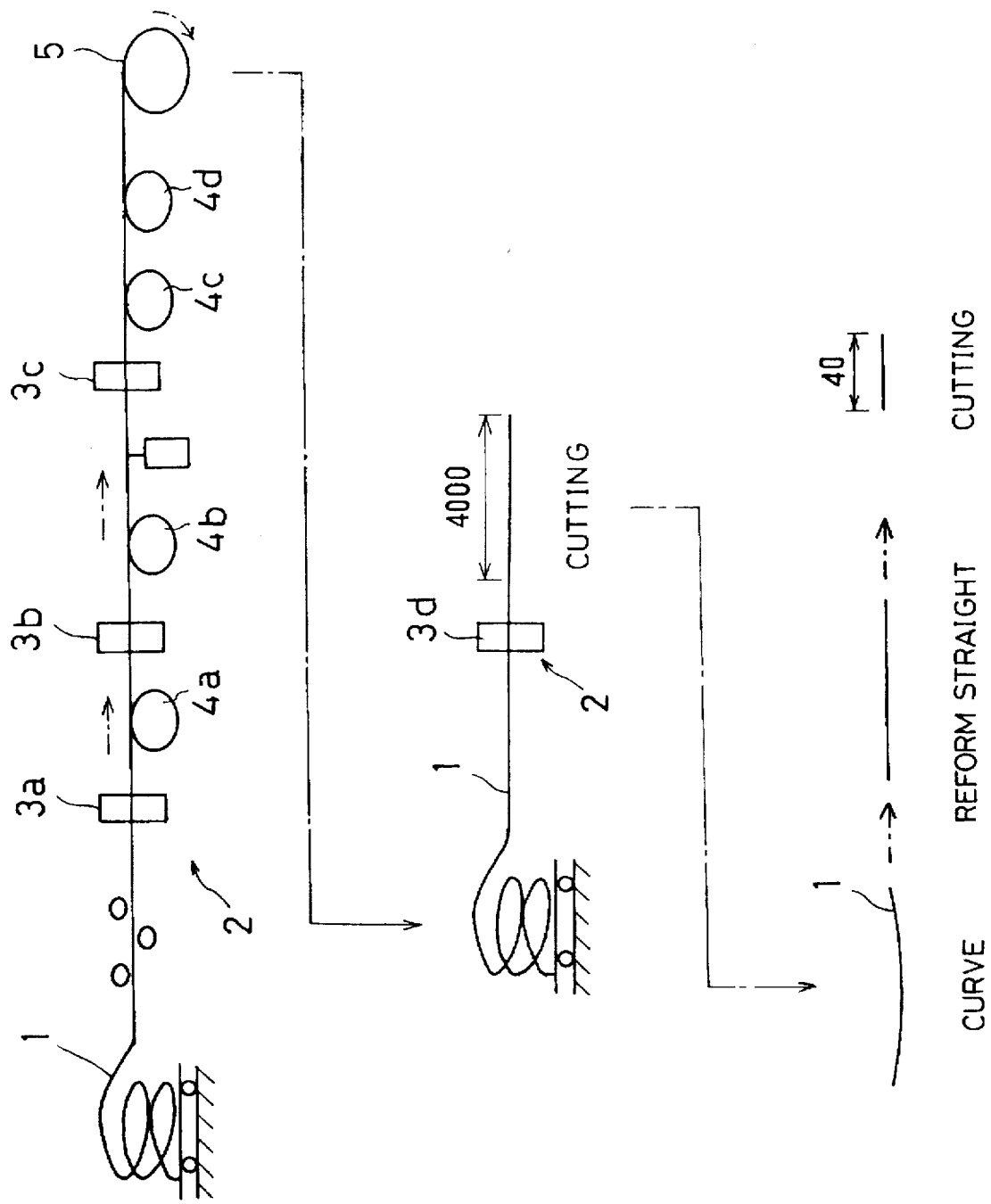
FIG. 4 is an illustration view showing an example of a conventional method for manufacturing a vibrator.

FIG. 3 is a graph showing the unevenness of the differences between temperature drifts of the natural frequencies of the vibrators manufactured according to the method in the embodiment shown in FIG. 1. In the test, the natural frequencies were measured in three directions in which the lines connecting the center of gravity and three vertices of an approximately regular triangle sectional sample vibrator. As shown in FIG. 3, The unevenness of the differences between the temperature drifts of the natural frequencies of the vibrators is smaller and stablized relative to products in the prior art. Hence, the vibrator can perform its function reliably without being affected by changes in atmospheric temperature. That is, the vibrator can be manufactured at a high productivity.

It is to be noted that the area of each molding hole of the respective dies and the area-reducing percentage of each die are appropriately selected, depending on the composition of a wire and characteristic accuracy required for each vibrator.

It will be apparent from the foregoing that, while the present invention has been described in detail and illustrated, these are only particular illustrations and examples, and the present invention is not limited to these.

What is claimed is:

1. A method of producing a triangular cross sectioned wire comprising:

forming a straight wire of substantially circular cross section;

cutting said straight wire of substantially circular cross section into at least one substantially straight length;

treating said at least one substantially straight length by applying heat thereto;

washing said at least one substantially straight length with acid; and drawing said at least one substantially straight length of said straight wire of substantially circular cross section through a plurality of substantially triangular shaped dies of successively reduced size without bending or winding said straight wire therebetween to form at least one substantially straight length of said straight wire having a triangular cross section.

2. The method of claim 1, wherein said triangular cross section is an approximately regular triangular cross section.

3. The method of claim 1, further comprising setting an area-reducing percentage of said triangular shaped dies to be such that plastic deformation proximate each longitudinal vertice of said straight wire having a triangular cross section is within a range of elastic strain which exhibits a substantially constant elastic character.

* * * * *